Oct. 23, 1962  H. LINDEMANN  3,059,514
MACHINE TOOLS
Filed Aug. 7, 1957  2 Sheets-Sheet 1
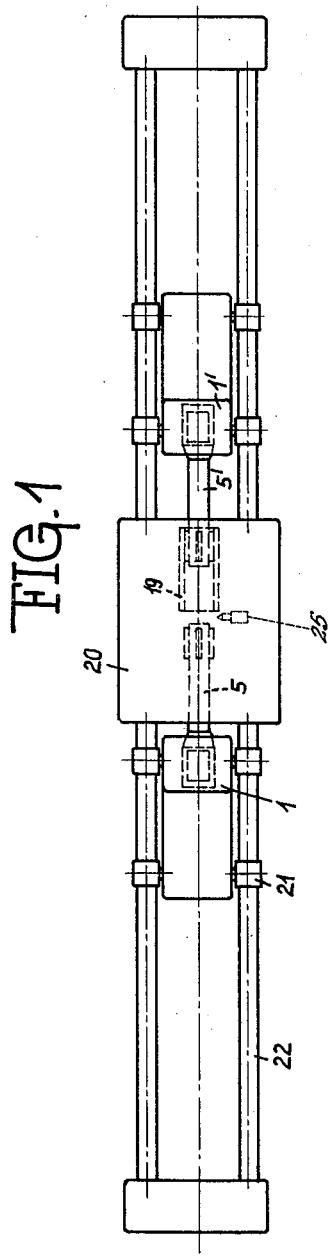
INVENTOR
Hans Lindemann
BY: Michael S. Striker
ATTORNEY

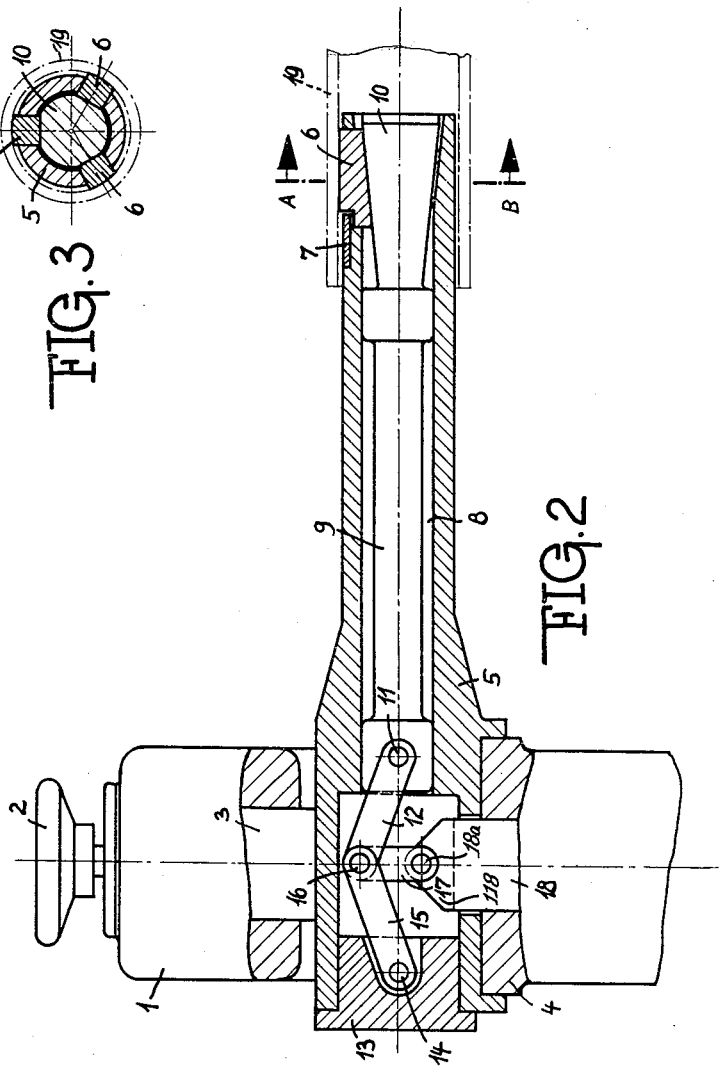

United States Patent Office 3,059,514
Patented Oct. 23, 1962

3,059,514
MACHINE TOOLS
Hans Lindemann, Bielefeld, Germany, assignor to
Th. Calow & Co., Bielefeld, Germany
Filed Aug. 7, 1957, Ser. No. 676,768
4 Claims. (Cl. 82—20)

This invention is concerned with improvements in tube turning machines of the type in which a tubular workpiece is moved axially with respect to a cutting tool which is mounted for rotary cutting action around the work.

It is already known to machine rod stock in machines of this type by means of one or more rotary cutter heads, the stock being drawn through the cutter head or heads by means of a carriage which is mounted so as to be displaceable in the direction of the longitudinal axis of the material being machined. A hollow housing carries the cutter head and machines of this type at present operate with a minimum length of the workpieces of about 2–3 m. The arrangements so far known are therefore so constructed that the clamping means for the workpiece and the carriages supporting the clamping means can be advanced only to about the front or rear ends of the housing of the cutter head. The disadvantage of such arrangements is that the minimum lengths of the workpieces to be machined are relatively large since the length of the workpiece must be greater than the length of the cutter head housing through which the workpiece passes so as to permit the support of the workpiece first by one clamping carriage at the front end of the cutter head housing and then by the other clamping carriage at the rear end of the cutter head housing.

It is one object of the invention to provide an apparatus which permits the machining of the outer surface of tubular workpieces of relatively short length, shorter than the cutter head housing of a conventional tube turning machine which is constructed for relatively long workpieces. Another object of the invention, is to adapt the clamping carriages and devices of such a conventional machine to permit the operation of internal clamping means for the machined tubes by apparatus which normally controls external clamping means for the workpieces.

According to the present invention, a tubular workpiece is not clamped by external clamping means on the outside thereof, but is clamped on the inside by internal clamping means. The clamping carriages of the conventional machine are used for clamping and supporting elongated internal clamping devices which can pass with the tubular workpiece held thereby into the rotary cutter head housing.

If external clamping means are used, for large diameter workpieces, the external clamping means can only be moved to the ends of the cutter head housing, so that the workpiece must be longer than the cutter head housing. On the other hand, if external clamping means are moved into the cutter head housing, which would be required for workpieces shorter than the cutter head housing, then the workpiece must be of substantially smaller diameter to permit the entering of the external clamping means into the cutter head housing.

When internal clamping means are used in accordance with the invention, the maximum inner diameter of the cutter head housing can be used for the workpiece, since the internal clamping means are located within the tubular workpiece, and do not interfere at all with the cutter head housing.

Since the internal clamping means according to the present invention can be made elongated to enter deeply into the cutter head housing, workpieces of very short axial length, substantially shorter than the cutter head housing can be machined, since such a workpiece is first introduced by one internal clamping means into the front end of the cutter head housing, moved in the same toward the rear end, and then taken over and internally gripped by the other internal clamping means which have been inserted into the rear end of the cutter head housing. Thereupon the first clamping means is released, and the workpiece is transported out of the rear end of the cutter head housing by the second internal clamping means. In this manner, tubes of short axial length but having a relatively large diameter can be machined on a conventional machine, which would be impossible if external clamping means were used. If for example the diameter of a tube to be machined is 250 mm., then it is possible to machine tube sections of this diameter, even if, for example, they have a length of 500 mm. If for example, the diameter of a tube to be machined is 30 mm., then one can machine tube sections of this diameter, if for example they have a length of 200 mm. It is preferable to derive the clamping and releasing of the expanding internal clamping devices from the control device which is provided on the carriage on an existent machine for operating an external clamping means of the same.

One embodiment of the invention is diagrammatically explained by means of the accompanying drawing. In the drawing, FIG. 1 is a plan view of a machine tool of the type described with two carriages;

FIG. 2 is a cross sectional view of an internal clamping device, held in the clamping carriage of a conventional machine, and FIG. 3 is a cross section along the line A—B of FIG. 2.

FIG. 1 shows clamping carriages 1 and 1′ movable on rollers 21 on guide rails 22 toward and away from the front and rear ends, respectively of a hollow cutter head housing 20 in which a cutter head 25 is mounted for machining workpieces transported by the clamping carriages 1 and 1′ through the cutter head housing 20. The clamping carriages 1 and 1′ are of corresponding construction, and the upper portion of clamping carriage 1 is shown on an enlarged scale in FIG. 2. The outer end of an internal clamping device 5 is clamped on clamping carriage 1 by means of a hand wheel 2 between external clamping means 3 and 4. At the free end of the mandrel-like internal clamping device 5 three slots are provided, in which internal clamping means, shown to be clamping jaws 6 are disposed. The clamping jaws 6 are prevented from falling out by segments 7 which are preferably secured by screws, not visible in the sectional view of FIG. 2, to device 5. A displaceable rod 9 is guided in the bore 8 of the internal clamping device 5, which rod has a cone 10 at one of its ends and a pin, pivot or the like 11 at its other end, about which a lever 12 is pivotable. It is assumed, that the internal clamping device is closed at one end by a cover 13. A pin 14 is mounted in the cover 13. The pin 14 serves as a journal for a toggle lever 15, which is connected both with the toggle lever 12 as well as with a connecting link 17 by means of a pivot 16, the connecting link 17 is connected by a pivot 18a to a projecting portion 118 of an operating part 18. Operating part 18, 118 is located and movable in a cylindrical part 4 of carriage 1. Operating part 18, 118 replaces a conventional clamping piston part which is hydraulically operated during the normal operation of the conventional machine which is improved by the present invention.

The conventional machine has external clamping means constituted by a clamping part 3 which is operated by turning of the hand wheel 2, and by the top face of the cylindrical part 4. In the conventional machine, the workpiece is directly clamped between parts 4 and 3, whereas in accordance with the improvement of the present invention, the internal clamping device 5 is clamped between parts 3 and 4 by operation of hand wheel 2. The operating part 18, 118 is connected by pivot pin 18a to link 17, so that when operating part 18 is displaced, the toggle levers 12 and 15 will longitudinally shift rod 9 whereby the clamping jaws 6 are outwardly moved by cone 10 to grip and clamp the inner surface of a tubular workpiece 19, as clearly shown in FIGS. 2 and 3.

Elements 9 to 18, 18a and 118 constitute operating means for the internal clamping jaw means 6.

The apparatus of the invention is operated in the following manner: If a relatively short tube section 19 is to be machined by the cutter head 25, the tube section 19 is gripped by the clamping jaws 6 of the internal clamping device 5 which is clamped in the clamping carriage 1. Clamping carriage 1 rolls on rollers 21 on guide rails 22 toward the cutter head 25 until the internal clamping means 5 with a tube 19 thereon passes into the cutter head. The rotating cutter head 25 then machines the tube 19, which is still mounted on the clamping carriage 1.

At a predetermined selectable moment, the tube 19 is gripped by the internal clamping device 5' of the second carriage 1', after both carriages 1 and 1' have run synchronously for a short time. By moving back the operating part 18 of the carriage 1 the connection between the internal clamping device 5 and the tube 19 is released and from then on workpiece tube 19 is drawn further through housing 20 only by the carriage 1' in the position shown in FIG. 1.

In the conventional machine which is improved by the present invention, a workpiece is clamped between parts 3 and 4 of the clamping carriage 1. Since clamping carriage 1 can only move to the left end of the cutter head housing 20, as viewed in FIG. 1, the workpiece must extend through the entire cutter head housing 20 and projects from the right end of the same so that it can be clamped by the clamping carriage 1' when the clamping carriage 1 has closely approached the left end of the cutter head housing 20. It is evident that the clamping carriages 1 and 1' cannot pass into the cutter head housing, which is easily accomplished by the internal elongated clamping devices 5 and 5'. Consequently short workpieces 19 can be transferred from the internal clamping means 5 to the internal clamping means 5' in accordance with the present invention, while a workpiece shorter than the cutter head housing 20, and held by the clamping carriage 1 of the conventional machine by external clamping means could not be reached by the external clamping means of the clamping carriage 1' which necessarily remains on the other side of the cutter head housing 20, and cannot pass into the same.

By simply mounting the internal clamping devices 5 and 5' in the external clamping means of the clamping carriages 1 and 1', which are normally used for clamping the outside of workpieces, the present invention renders it possible to adapt conventional machine of the above described type for operation on short tubes, which would, in accordance with the prior art, require an additional machine having a shorter cutter head.

All that is necessary to use the external clamping devices of the conventional machine for the internal clamping devices 5, 5' of the present invention, is to provide internal clamping devices 5, 5' whose outer ends have such a diameter that they can be gripped and clamped between the external clamping device 3, 4 which, in the conventional machine, is used to clamp the outside of the workpiece.

Of course, the standard clamping piston of the conventional machine must be replaced by the special operating part 18, 118 so that the internal clamping device 5 can be operated by the hydraulic operating means of the conventional machine.

I claim:

1. In a machine tool for working on the outer surface of a tubular work piece, in combination, a housing having two aligned openings; a tool arranged in said housing intermediate said aligned openings and spaced therefrom; two carrier means reciprocably mounted for movement between respective positions nearer to said housing and farther therefrom; elongated support means respectively on said two carrier means extending from the same towards said two openings respectively so as to be each movable during movement of said carrier means between a position in which the front end of said elongated support means projects through one of said openings into said housing in the region of said tool arranged therein, and a position located entirely outside of said housing; internal tube gripping means mounted on each of said support means at the front end thereof; and actuating means mounted on each of said carrier means for actuating said gripping means, whereby a work piece may be worked upon over its entire outer surface from end to end by said tool while supported first by one and then by the other of said internal tube gripping means.

2. In combination with a tube turning machine which comprises elongated guide means extending in one direction; an elongated tubular housing located above the central region of said guide means and extending in the direction of the same, said housing having open ends, a rotary cutter head in said housing; a pair of clamping carriages mounted on said guide means at opposite ends of said housing and being movable on said guide means to and from an inner position spaced from each other at least the length of said tubular housing, each clamping carriage including external clamping means adapted to clamp the outside of the ends of a tubular workpiece projecting out of said housing; the improvement comprising a pair of elongated internal clamping devices, said internal clamping devices having an outer end respectively clamped by said external clamping means of said carriages, and inner ends projecting into said housing and being closely spaced from each other at least in said inner position of said clamping carriages, said clamping devices including internal clamping means located at said inner ends for clamping the inner surface of a tubular workpiece shorter than said housing, while the outer surface of the workpiece is engaged by said rotary cutter head while the workpiece is transported by said carriage means.

3. In combination with a tube turning machine which comprises elongated guide means extending in one direction; an elongated tubular housing located above the central region of said guide means and extending in the direction of the same, said housing having open ends; a rotary cutter head in said housing; a pair of clamping carriages mounted on said guide means at opposite ends of said housing and being movable on said guide means to and from an inner position spaced from each other at least the length of said tubular housing, each clamping carriage including external clamping means having means for moving a clamping part to and from a clamping position adapted to clamp the outside of the ends of a tubular workpiece projecting out of said housing; the improvement comprising a pair of elongated internal clamping devices, said internal clamping devices having outer ends respectively clamped by said external clamping means of said carriages, and inner ends projecting into said housing and being closely spaced from each other at least in said inner position of said clamping carriages, said clamping devices including internal clamping jaw means located at said inner ends for clamping the inner surface of a tubular workpiece shorter than said housing, while the outer surface of the workpiece is engaged by said rotary cutter head and while the workpiece is transported by said carriage means, said internal clamping devices, respectively, including operating means connected to said internal clamping jaw means and having a part located at the outer end of the respective internal clamping device and replacing said clamping part so as to be operatively connected to said means of said external clamping means and to be operated by the same for moving said internal clamping jaw means outwardly to a clamping position.

4. A clamping arrangement comprising, in combination, a clamping carriage; an external clamping means mounted on said carriage and including means for moving a clamping part between an outer position and an inner clamping position for clamping the outer surfaces of tubular workpieces; and an elongated internal clamping device having one end clamped by said external clamping means, and another end including an internal clamping jaw means for clamping the inner surface of tubular workpieces, said internal clamping device including operating means connected to said internal clamping jaw means and having a part located at the outer end of said clamping device and replacing said clamping part so as to be operatively connected to said means of said external clamping means and to be operated by the same for moving said internal clamping means outwardly to a clamping position.

References Cited in the file of this patent
UNITED STATES PATENTS

| | | |
|---|---|---|
| 283,376 | Coffin | Aug. 21, 1883 |
| 2,289,167 | Bannister | July 7, 1942 |
| 2,338,687 | Johnson | Jan. 4, 1944 |
| 2,427,322 | Darner | Sept. 9, 1947 |
| 2,555,170 | Wall | May 29, 1951 |
| 2,561,035 | Robichaud | July 17, 1951 |
| 2,698,551 | Olsen | Jan. 4, 1955 |
| 2,750,196 | Peczynski | June 12, 1956 |
| 2,788,887 | Johnson | Apr. 16, 1957 |
| 2,851,274 | Greer | Sept. 9, 1958 |